United States Patent [19]

Takenaka

[11] Patent Number: 5,212,367
[45] Date of Patent: * May 18, 1993

[54] METHOD OF READING POSITIONAL INFORMATION ON PHOTOGRAPHIC FILM

[75] Inventor: Yuji Takenaka, Kanagawa, Japan

[73] Assignee: Fuji Photo Film Co., Ltd., Kanagawa, Japan

[*] Notice: The portion of the term of this patent subsequent to Oct. 2, 2007 has been disclaimed.

[21] Appl. No.: 343,643

[22] Filed: Apr. 27, 1989

[30] Foreign Application Priority Data

Apr. 28, 1988 [JP] Japan ................. 63-106105

[51] Int. Cl.⁵ .............. G06K 15/20; G06K 7/10; G03B 23/12; G03B 27/32
[52] U.S. Cl. ................... 235/375; 235/462; 235/476; 353/26 A; 355/77
[58] Field of Search ........... 235/375, 376, 454, 469, 235/475, 476, 440, 456, 462; 250/571, 566, 568, 570; 353/26 R, 26 A, 27 R, 27 A; 355/40, 41, 77, 50, 51; 354/21

[56] References Cited

U.S. PATENT DOCUMENTS

| | | | |
|---|---|---|---|
| 3,949,363 | 4/1976 | Holm | 235/462 |
| 4,147,928 | 4/1979 | Crean et al. | 235/454 |
| 4,207,473 | 6/1980 | Nakatani et al. | 250/570 |
| 4,408,344 | 10/1983 | McWaters et al. | 235/462 |
| 4,538,072 | 8/1985 | Immler et al. | 235/440 |
| 4,555,632 | 11/1985 | Vockenhuber | 250/560 |
| 4,629,876 | 12/1986 | Kubota et al. | 235/462 |
| 4,691,112 | 9/1987 | Wydler | 250/570 |
| 4,727,399 | 2/1988 | Matsumoto | 250/571 |
| 4,748,317 | 5/1988 | Satoh | 235/462 |
| 4,792,670 | 12/1988 | Fukana et al. | 250/211 R |
| 4,806,990 | 2/1989 | Tahara | 355/75 |
| 4,825,387 | 4/1989 | Ono | 355/40 |
| 4,906,854 | 3/1990 | Ranh et al. | 250/570 |
| 4,918,484 | 4/1990 | Ujiie et al. | 355/77 |
| 4,961,086 | 10/1990 | Takenaka | 235/462 |

FOREIGN PATENT DOCUMENTS

1499760 7/1970 Fed. Rep. of Germany.
52-111718 9/1977 Japan.
56-128933 10/1981 Japan.

Primary Examiner—Eugene R. LaRoche
Assistant Examiner—Christopher R. Glembocki
Attorney, Agent, or Firm—Sughrue, Mion, Zinn, Macpeak & Seas

[57] ABSTRACT

A method of reading positional information on photographic film in which items of positional information are read during the feeding of an elongated photographic film, the positional information items being provided in a predetermined sequence and in correspondence with a plurality of image frames recorded on the film in the longitudinal direction thereof. The number of feed pulses that corresponds to the direction and the distance which the photographic film is fed is calculated. On the basis of the calculated number of feed pulses and of the corresponding item of positional information, the number of feed pulses corresponding to a predetermined reference position is calculated. On the basis of the calculated number of feed pulses corresponding to the predetermined reference position, the position at which each of the following items of positional information have been read is checked. Based on the number of feed pulses, it is therefore possible to check whether or not the read positional information items are correct.

9 Claims, 9 Drawing Sheets

FIG. 5(A) NEGATIVE FORWARD FEEDING DIRECTION
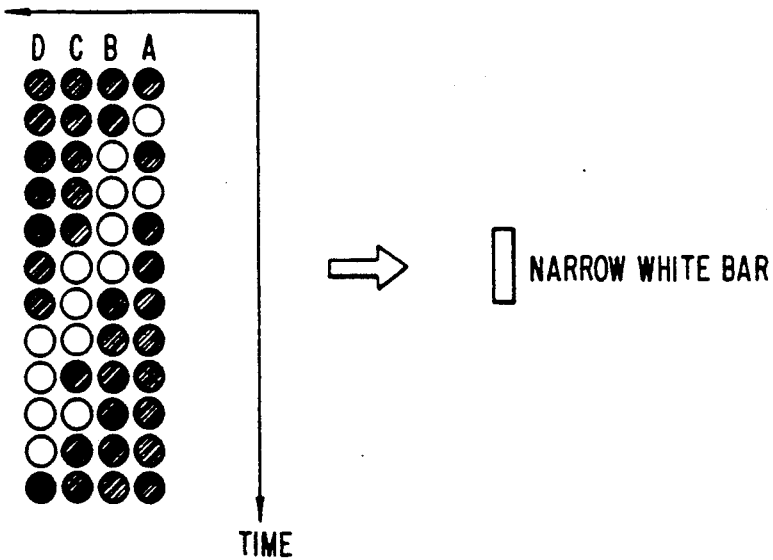
⇒ NARROW WHITE BAR
FIG. 5(B) NEGATIVE FORWARD FEEDING DIRECTION
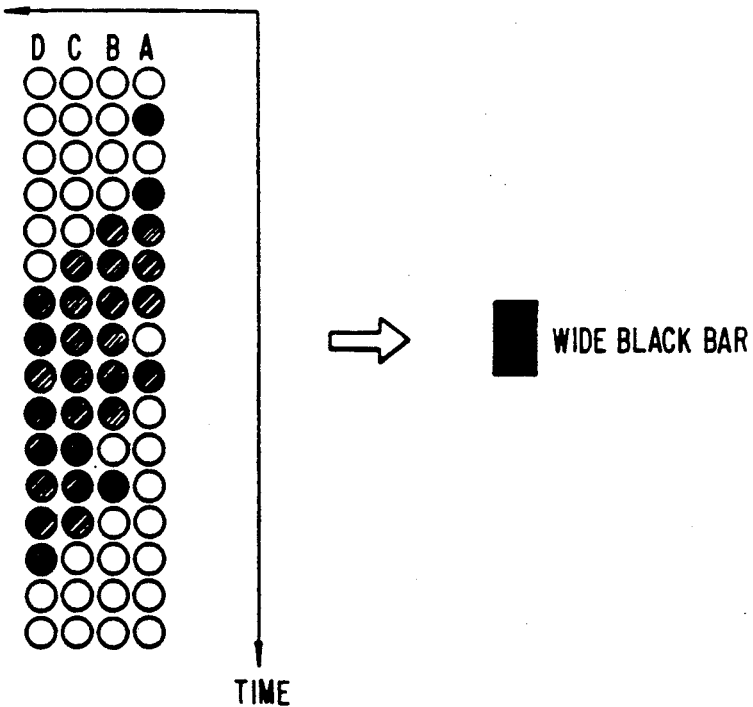
⇒ WIDE BLACK BAR

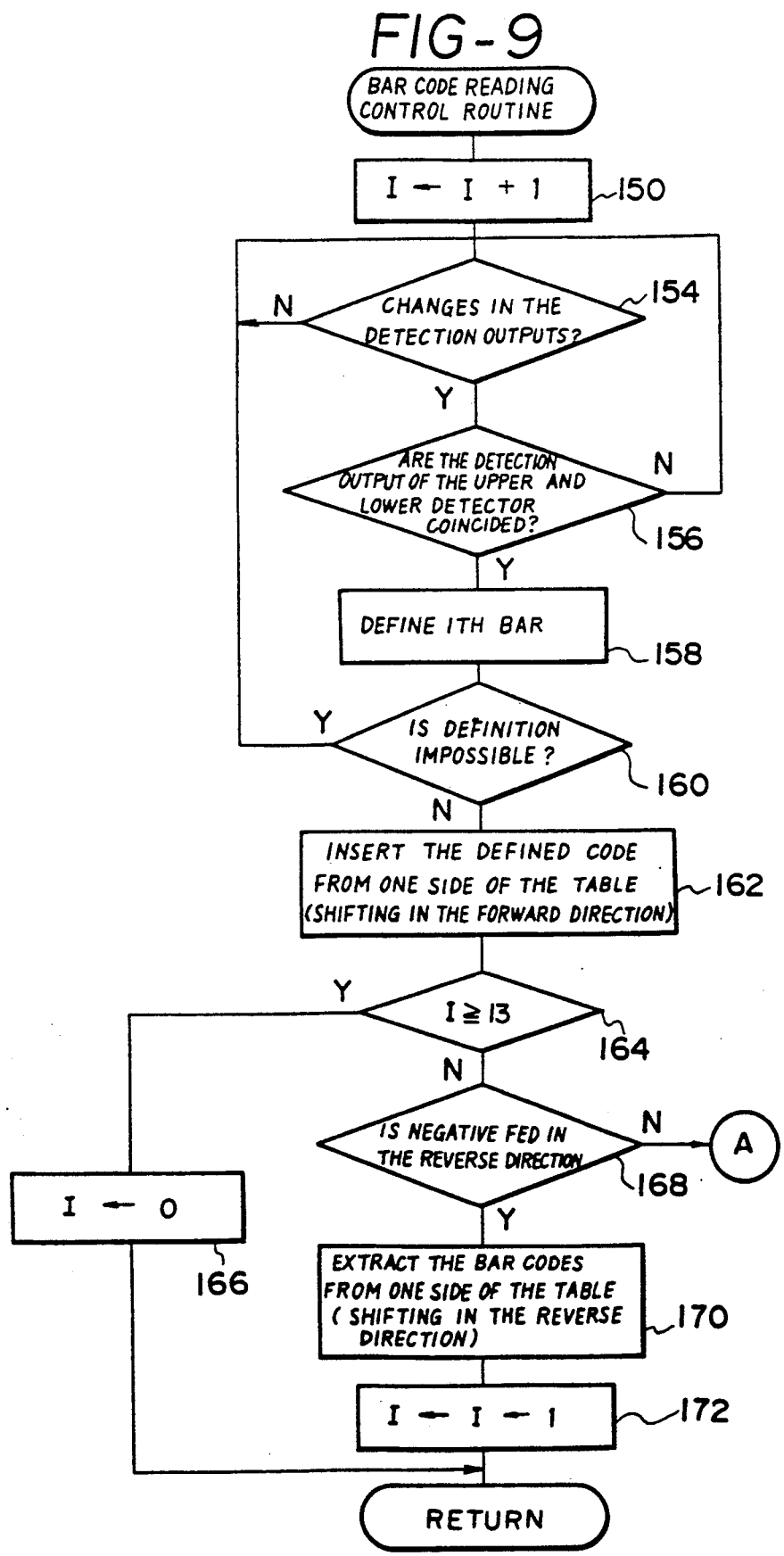

METHOD OF READING POSITIONAL INFORMATION ON PHOTOGRAPHIC FILM

BACKGROUND OF THE INVENTION

1. Field of the Invention

The present invention relates to a method of reading positional information on photographic film in which each item of positional information provided for each image frame is read, and which is capable of checking the number of each image frame and the position thereof.

2. Related Art

In general, a photograph printer has an arrangement in which a photographic film such as a negative or a positive is set in a negative carrier, a portion of the film is positioned in the printing position of the printer main body, and printing is effected on printing paper. The negative carrier is equipped with a feed apparatus which feeds an elongated negative film in the longitudinal direction thereof, so that image frames of the film are successively positioned in the printing position to be subjected to printing operations.

Items of positional information are each provided in the vicinity of each image frame, and are located at the same relative position with respect to the corresponding image frames. The items of positional information provided for the individual image frames are read by a positional information sensor, so as to select certain image frames whose images are to be printed. Each of the selected image frames is automatically positioned in the printing position on the basis of notches formed in correspondence therewith. The positional information is provided in the form of bar codes. These bar codes correspond to a series of frame numbers having a predetermined sequence in the longitudinal direction of the film. Therefore, when one of the frame numbers is input by the operator, a particular bar code corresponding to the input frame number can be found out. Thus, the provision of the bar codes facilitates positioning even when image frames are to be subjected to discontinuous printing during, e.g., reprinting.

However, in the event that any bar code is read erroneously, there is a risk that an image frame having a frame number different from the input frame number may be brought to the printing position, or a risk that the bar code corresponding to the designated frame number may not be found out. In order to prevent any reading error and, hence, any erroneous operation such as that described above, it has been necessary for the operator to always monitor the position determining to see if each of the designated image frames is correctly positioned in the printing position. This has made it impossible to perform efficient operation.

SUMMARY OF THE INVENTION

In view of the above-described circumstances, an object of the present invention is to provide a method of reading positional information on photographic film which is capable of checking the number and the position of a particular image frame that has been designated even when an error has occurred in the reading of the positional information item corresponding to the designated image frame.

According to the present invention, there is provided a method of reading positional information on photographic film in which items of positional information are read during the feeding of an elongated photographic film in the longitudinal direction thereof, the positional information items being provided in a predetermined sequence and in correspondence with at least one image frame recorded on the film in the longitudinal direction. The method comprises the steps of: (a) calculating the number of feed pulses forming a unit thereof on the basis of a predetermined pitch, by performing addition or subtraction in accordance with the direction and the distance which the photographic film is fed; (b) calculating the number of feed pulses corresponding to a predetermined reference position on the basis of one item of the positional information read and of the number of feed pulses reached at the time of the reading of the one positional information item; and (c) checking the position at which each of the following items of the positional information is read, using as the reference the number of feed pulses corresponding to the predetermined reference position.

According to the present invention, the number of feed pulses based on a predetermined pitch is obtained. If a pulse motor is used in the photographic film drive system, pulses generated to drive the pulse motor may be used as the feed pulses. Alternatively, an encoder may be used to form a new group of pulses in response to the feeding of the photographic film.

According to the method of the present invention, the number of these feed pulses is calculated by performing addition and subtraction in accordance with the direction and the distance which the photographic film is fed, thereby calculating the number of feed pulses reached at the time of the reading of one positional information item. On the basis of the thus calculated number of the feed pulses and of the read positional information item, the number of feed pulses corresponding to a predetermined reference position is calculated. This predetermined reference position may be any position insofar as one of the positional information items is provided at this position.

The method of the present invention may further have the following arrangement. The above-stated processes are repeated so that, at the time of the reading of a subsequent item of the positional information, the number of feed pulses corresponding to the predetermined reference position is calculated on the basis of this read item of the positional information and of the number of feed pulses reached at the time of this reading. The thus calculated numbers of feed pulses are compared. If it is determined that the calculated numbers of feed pulses do not accord with each other, it is determined that a reading error has occurred in either of the readings of the positional information items. Such calculations are performed until the calculated numbers for feed pulses corresponding to the predetermined reference position accord with each other.

When it is determined that the calculated numbers of feed pulses corresponding to the predetermined reference position accord with each other, the reading positions of other items of the positional information are each checked using as the reference the number of feed pulses corresponding to the predetermined reference position. It is therefore possible to check whether or not the actual position at which an item of the positional information has been read and the actual result of this reading are correct. In this way, even in the case that, after a setting of the number of feed pulses corresponding to the predetermined reference position, a failure occurs in the sensor for reading the positional information, thereby making it impossible to read the positional information properly, items of the positional information can correspond to the image frames if items of the positional information are discriminated in a predetermined sequence referring to the unit formed by a certain number of feed pulses that corresponds to a certain pitch of the image frames, and to the above-described predetermined reference position serving as the starting point.

BRIEF DESCRIPTION OF THE DRAWINGS

FIGS. 5 (A) and (B) are views used to explain the state in which the outputs of the detecting sections change with the movement of bars;

FIGS. 7 through 9 show control flow charts.

DESCRIPTION OF THE PREFERRED EMBODIMENT

Figure 1:
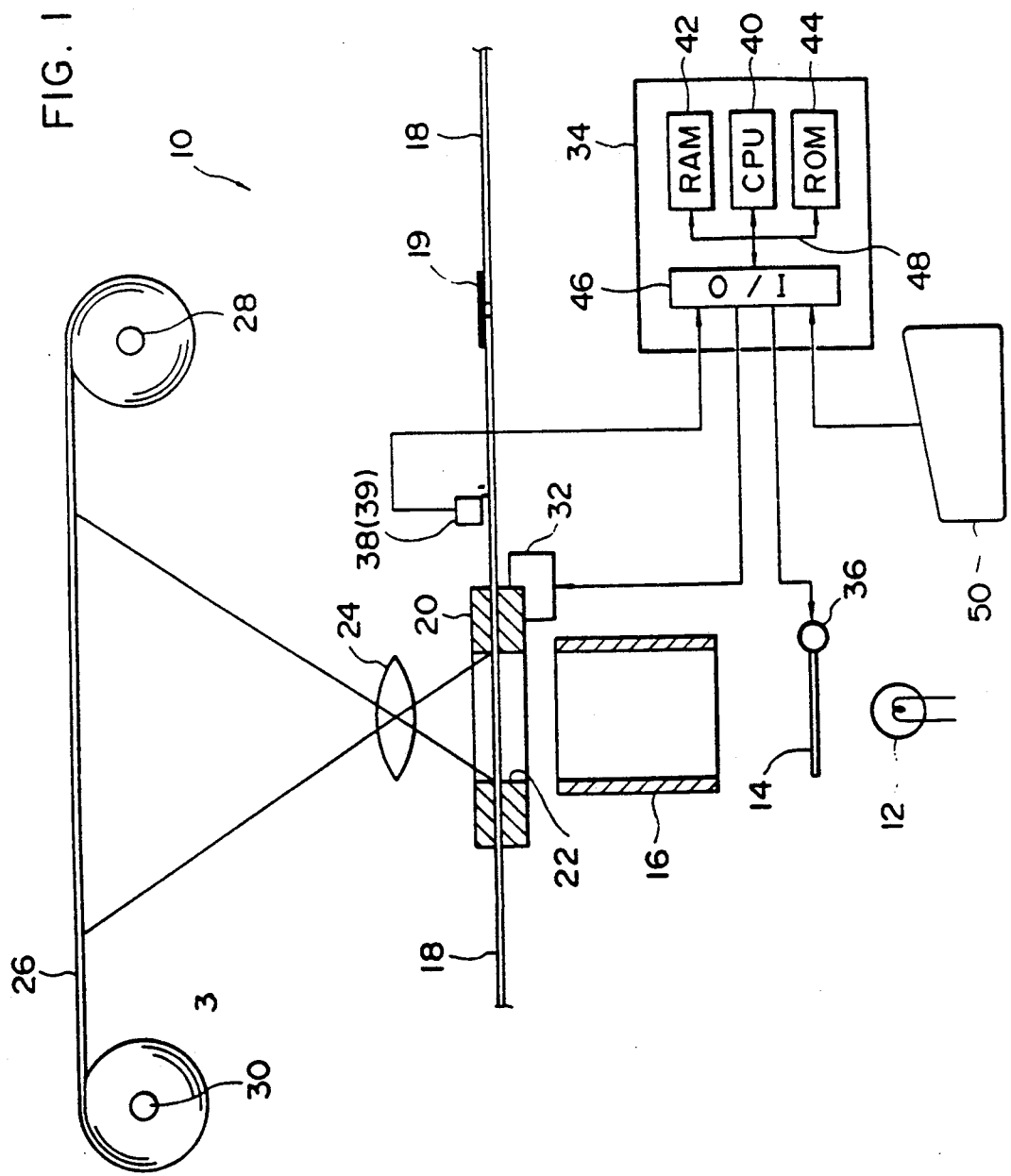
FIG. 1 is a view schematically showing an example of a photograph printer to which one embodiment of the method in accordance with the present invention is applied.

FIG. 1 shows a photograph printer 10 to which the method of the present invention is applied. Light generated from a light source 12 propagates through a filter (not shown), a shutter 14, and a light diffusion cylinder 16 to a negative 18 serving as a photographic film. The negative 18 is elongated in shape and has a plurality of image frames recorded thereon in the longitudinal direction thereof. Another negative 18 of the same shape is connected to one end of the first negative 18 by means of a piece of splicing tape 19. In this way, a plurality of negative films 18 are connected so that they can be fed continuously.

The series of negative films 18 is held by a negative carrier 20 having an opening 22. When an image frame whose image is to be printed is positioned in the opening 22, the light transmitted through the image frame reaches a lens 24. Image frames of the negative 18 are formed with notches 18B in correspondence therewith. These notches 18B are each detected by a notch detecting sensor (not shown) so that a particular image frame whose image is to be printed can be easily positioned in the printing position. The notches 18B are formed by a notch puncher (not shown) when the negative films 18 are inspected after development.

Light which has transmitted through the lens 24 is radiated on the emulsion surface of printing paper 26, thereby exposing a part of the printing paper 26. End portions of the printing paper 26 are wound in a layered manner on winding rollers 28 and 30. A certain length of the printing paper 26 is wound out from the roller 28 and wound onto the roller 30 each time an intermediate part has been exposed to the light transmitted through one image.

The negative carrier 20 is equipped with a drive apparatus 32 for feeding the negative films 18. The drive apparatus 32 is connected to a controller 34 and driven by a signal supplied therefrom. The drive apparatus 32 comprises a pulse motor (not shown) which feeds the negative films 18 in accordance with the number of pulses supplied from the controller 34. In the illustrated embodiment, the films 18 are fed a distance of 0.1 mm per pulse. The shutter 14 is also connected to the controller 34 via a driver 36 in such a manner as to be opened for a predetermined period of time during printing.

A pair of positional information detecting sensors 38 and 39 are provided upstream of the negative carrier 20 to serve as the positional information detecting means. Specifically, these sensors 38 and 39 read bar codes 18A (see FIG. 2) provided on each negative film 18 as the negative film 18 is being fed. The pair of positional information detecting sensors 38 and 39 are disposed in the longitudinal direction of bars forming the bar codes 18A. Specifically, the sensors 38 and 39 are disposed in the vicinity of the two longitudinal ends of the bars of bar codes 18A, and are so designed as to be able to detect a bar of a bar code 18A if there is any. When a bar of a bar code 18A has been read by the positional information detecting sensors 38 and 39, corresponding data items are supplied to the controller 34.

In this embodiment, the pair of sensors 38 and 39 are provided for the following reason. In some cases, the negative film 18 may be provided with symbols or characters which are not the bar codes 18A but which move on same locus as the portion where the bar codes 18A are provided. For instance, ordinary Arabic numerals may be provided together with the bar codes 18A so as to indicate image frame numbers. In such cases, there is a risk of the symbols or the like being erroneously read as members of the bar codes 18A, thereby leading to a reading error. Based on the fact that the bars forming the codes 18A have constant vertical dimensions while numerals, etc., have various configurations in the vertical direction, the controller 34 has the following arrangement. The controller 34 makes a determination as to whether or not the values detected by the pair of positional information detecting sensors 38 and 39 are identical, thereby preventing any symbols or the like which are not bar codes 18A from being erroneously read as members of the bar codes 18A.

The controller 34 includes a CPU 40, a RAM 42, a ROM 44, an input output port (I/O) 46, and buses 48 connecting these members and including data buses and control buses. Signal lines from the driver 36 for the shutter 14, the drive apparatus 32, and the positional information detecting sensors 38 and 39 are each connected to the I/O 46. A keyboard 50 is also connected to the I/O 46.

Figure 2:
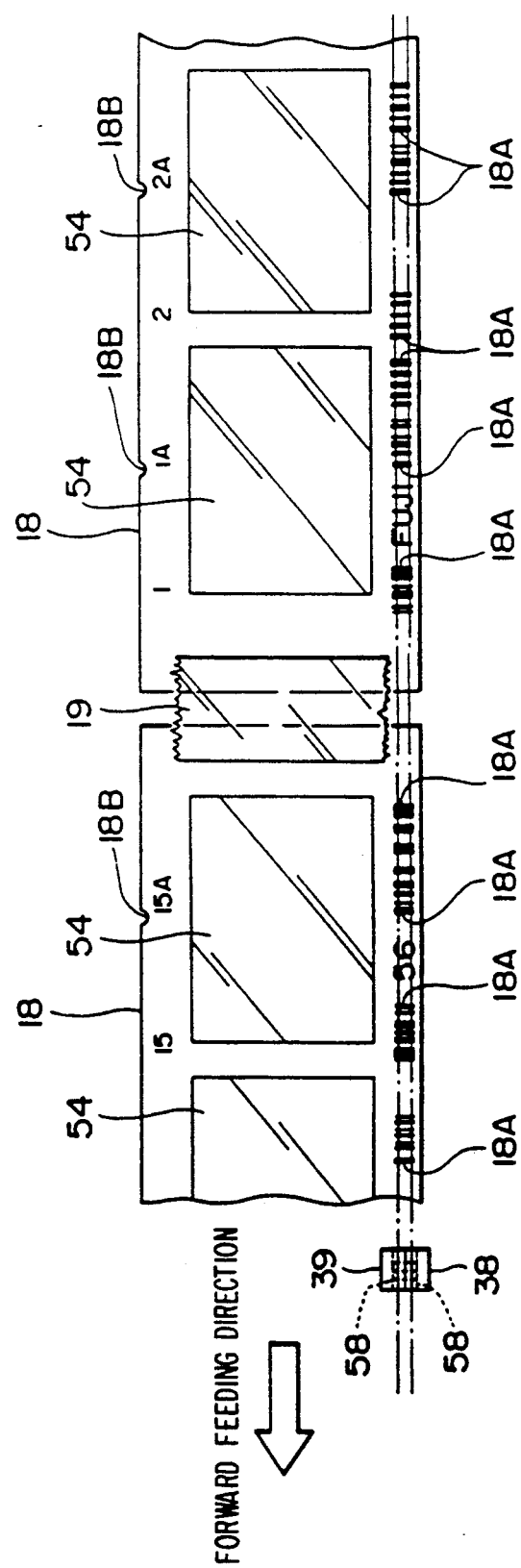
FIG. 2 is a plan view of a negative.

Referring to FIG. 2, the bar codes 18A are provided on the negative 18 and at the same relative position with respect to the corresponding image frames 54 of the film 18. The pair of positional information detecting sensors 38 and 39 are provided in correspondence with the locus of movement of the bar codes 18A.

The bar codes 18A correspond to the image frame numbers. When data resulting from the reading of a particular bar code 18A by the positional information detecting sensors 38 and 39 are processed by data conversion circuits 56 (see FIG. 3), a particular frame number which corresponds to the bar code 18A can be specified. With this arrangement, therefore, in order to locate the image frame 54 having the frame number designated through the keyboard 50, the frame number based on the data read by the position information detecting sensors 38 and 39 is compared with the designated frame number. The frame numbers are arranged in a predetermined sequence, for instance, in the order of 1, 1A, 2, 2A, 3, 3A, . . . , and are stored in the RAM 42 of the controller 34.

Figure 3:
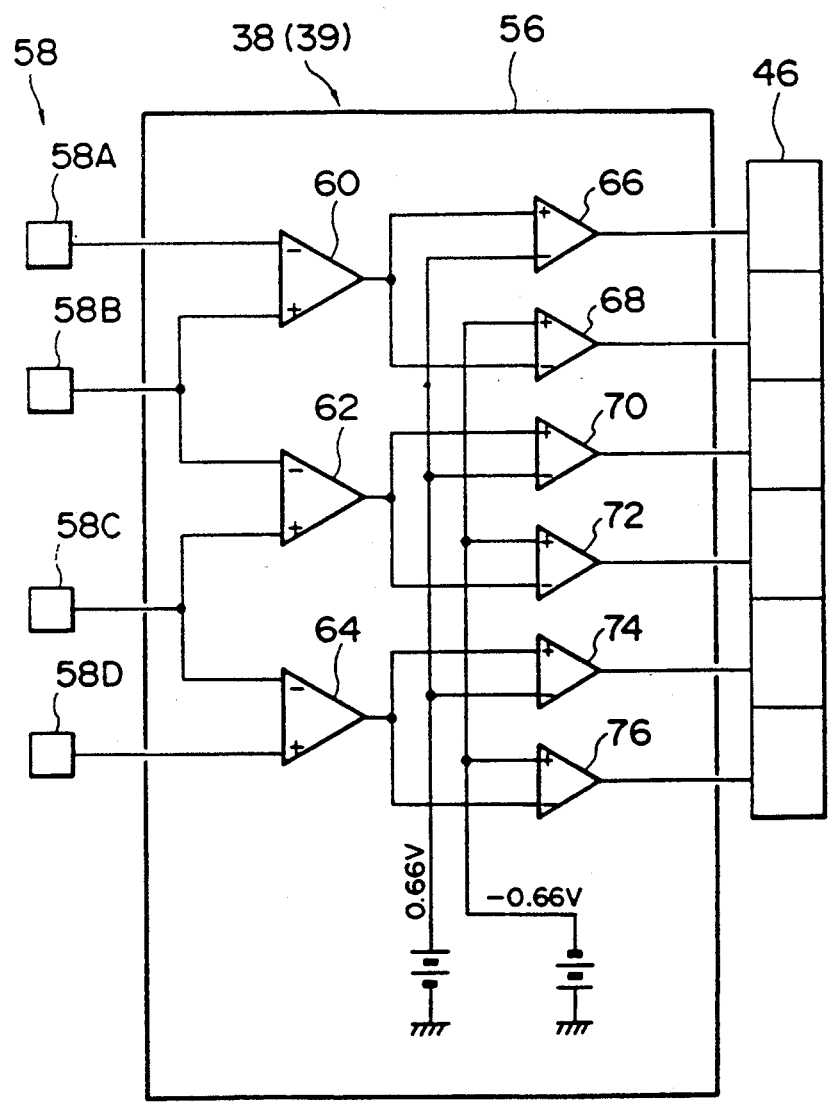
FIG. 3 is a block diagram of a circuit including a data conversion circuit of a positional information detecting sensor.
Figure 4A:
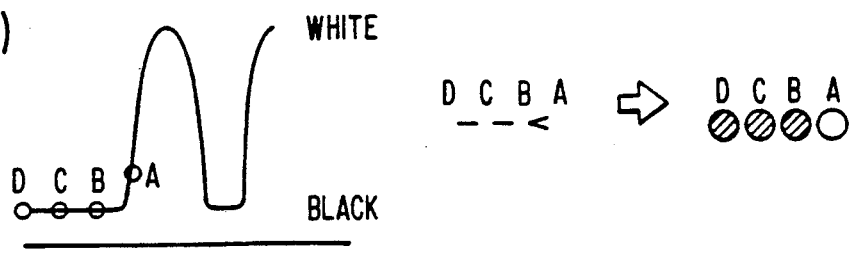
FIGS. 4 (A) to (E) are views used to explain the manner in which bars constituting a bar code are discriminated on the basis of the result of detection by detecting sections.
Figure 4B:
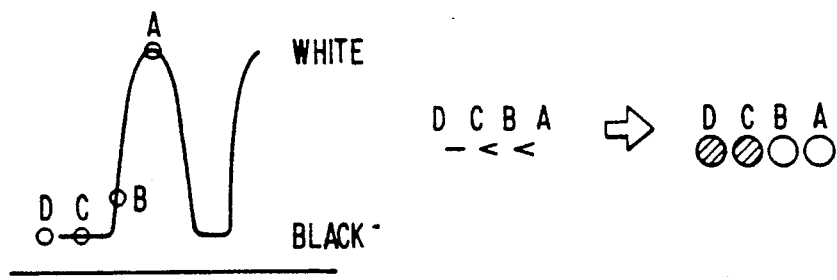
Figure 4C:
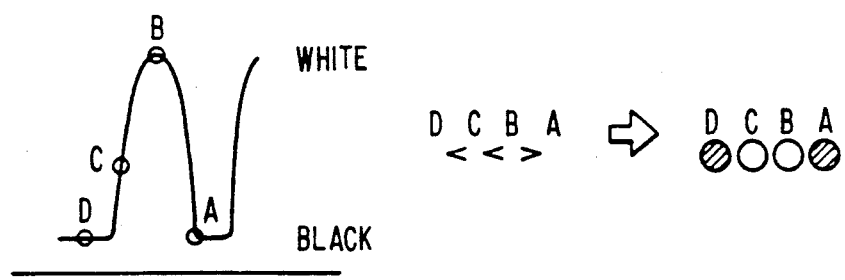
Figure 4D:
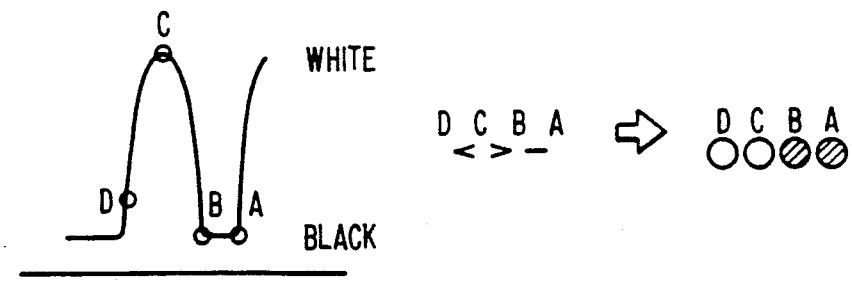
Figure 4D:
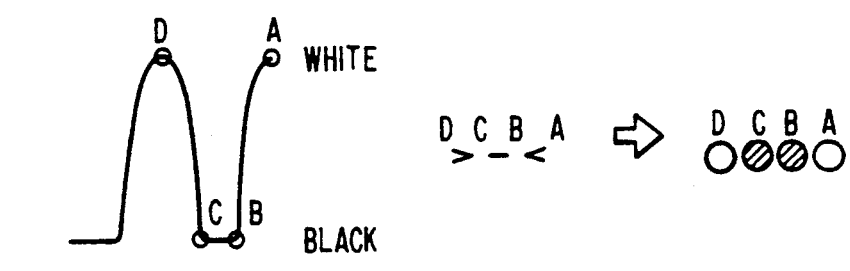

Referring to FIG. 3, each positional information detecting sensor 38 (or 39) has four detecting sections 58A, 58B, 58C and 58D, and the conversion circuit 56. Since there are two different widths, a narrow width and a wide width, of bars constituting a set of bar codes 18A, the detecting sections 58A–58D are arranged at a distance corresponding to the wide width of bar, with two adjacent detecting sections being arranged at a distance corresponding to the narrow width bar.

The data conversion circuit 56 has first to third subtracters. A signal line from the detecting section 58A is connected to the negative input terminal of the first subtracter 60, and a signal line from the detecting section 58B is connected to the positive input terminal of the subtracter 60. Similarly, the signal line from the detecting section 58B is connected to the negative input terminal of the second subtracter 62, and a signal line from the detecting section 58C is connected to the positive input terminal of the subtracter 62. The signal line from the detecting section 58C is connected to the negative input terminal of the third subtracter 64, and a signal line from the detecting section 58D is connected to the positive input terminal of the subtracter 64.

The circuit 56 also has six comparators. An output signal line from the first subtracter 60 is connected to the positive input terminal of a first comparator 66 and to the negative input terminal of a second comparator 68. Similarly, an output signal line from the second subtracter 62 is connected to the positive input terminal of a third comparator 70 and to the negative input terminal of a fourth comparator 72. An output signal line from the third subtracter 64 is connected to the positive input terminal of a fifth comparator 74 and to the negative input terminal of a sixth comparator 76. A $+V$ (0.66 V) is applied to each of the negative input terminals of the first, third and fifth comparators 66, 70 and 74, and a $-V$ ($-0.66$ V) is applied to each of the positive input terminals of the second, fourth and sixth comparators 68, 72 and 76. With this arrangement, the I/O 46 is supplied with items of data which each correspond to the absolute value of the difference in output between two adjacent detecting sections. For instance, the first and second comparators 66 and 68 produce a high-level signal if $|A-B|>0.66$ V, whereas they produce a low-level signal if $|A-B|<0.66$ V (A and B respectively representing the outputs of the detecting sections 58A and 58B). In this manner, differences in output between two adjacent ones of the detecting sections are determined, and items of data indicative of these differences are supplied to the controller 34. The controller 34 operates, on the basis of the differences between the outputs of the detecting sections 58A, 58B, 58C and 58D, to make a determination as to whether a white portion or a black portion of a bar code 18A is passing the detecting position, as well as a determination as to the width of the bar (i.e., whether the bar is wide or narrow). The manner in which these determinations are made will be explained below referring to FIG. 4. In the following descriptions, the outputs of the detecting sections 58A, 58B, 58C, and 58D will be indicated as A, B, C and D, respectively.

If, as shown in FIG. 4 (A), the interrelationship between outputs A to D are determined to be $A>B=C=D$, this means that the output A alone is greater than any other output. In this case, therefore, it is determined that a white bar is currently detected by the detecting section 58A.

When the film 18 has moved to achieve the state shown in FIG. 4 (B), and if the interrelationship is determined to be $A>B>C=D$, this means that both the outputs A and B are greater than the other outputs. In this case, therefore, it is determined that a white bar is currently detected by both the detecting sections 58A and 58B.

If, as shown in FIG. 4 (C), the interrelationship is determined to be $A<B>C>D$, it is determined that the white bar has passed the detecting section 58A and is currently detected by the detecting sections 58B and 58C. Accordingly, it is determined that this bar is a narrow white bar.

If, as shown in FIG. 4 (D), the interrelationship is determined to be $A=B>C>D$, since this means a positional shift has occurred from the state shown in FIG. 4 (C) in the forward direction, it is possible to determine that the negative film 18 is moving in the forward direction.

If, as shown in FIG. 4 (E), the interrelationship is determined to be $A>B=C<D$, this means that a subsequent black bar is currently detected by the detecting sections 58B and 58C. Since these sections 58B and 58C alone are currently detecting the black bar, it is determined that this subsequent black bar is a narrow bar.

FIGS. 5 (A) and (B) each show changes in the state of detection by the detecting sections 58A to 58D with the movement of bars in a bar code 18A. Specifically, FIG. 5 (A) shows changes in the outputs A to D of the detecting sections 58A to 58D, respectively, with the movement of a narrow white bar. FIG. 5 (B) shows changes in the outputs A to D of the sections 58A to 58D with the movement of a wide black bar. As will be understood referring to FIGS. 5 showing changes in the detection outputs, if, for instance, the negative film 18 stops moving or if it starts to be fed in the reverse direction, it is possible to recognize such a fact.

Figure 6:
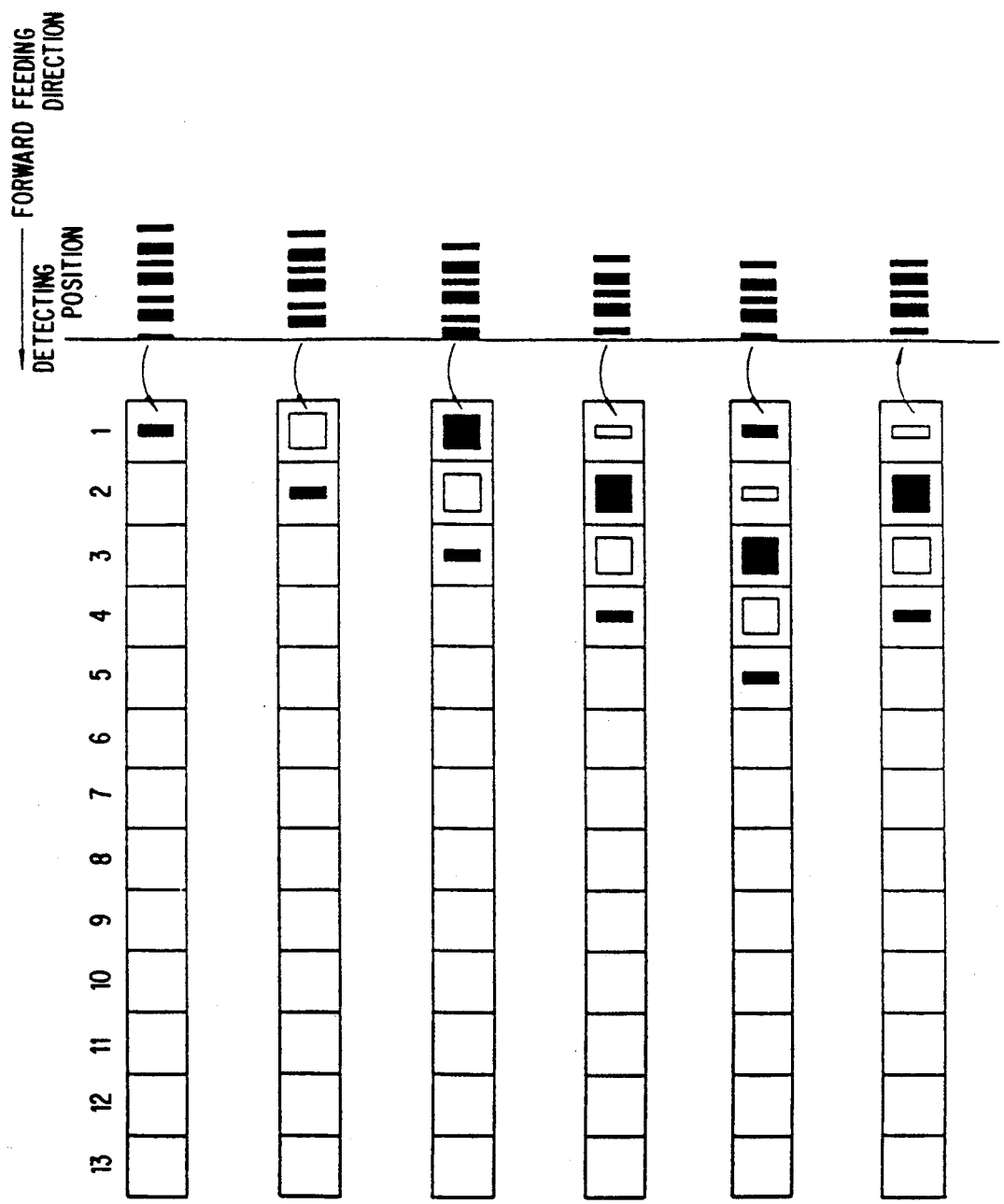
FIG. 6 is a view used to explain the state in which data corresponding to bar codes are stored into a table.

Bars constituting one set of bar code 18A (in the illustrated embodiment, a set of bar code comprises thirteen bars) are detected by repeating the above-described detection. Items of data resulting from the detections are successively stored into a table in the RAM 42 (a buffer memory may be used). The storing is performed in the manner shown in FIG. 6. That is, an item of data corresponding to a newly detected bar is always added to the table into the region No. 1 (on the right side as viewed in FIG. 6), and, in compliance with this, items of data already stored are successively shifted to the left. If the negative 18 is being fed in the reverse direction, some of the items of data stored are removed in accordance with the distance of this movement, with the data item on the right side being removed first, and the remaining data items being successively shifted to the right. When all the thirteen regions of the table are filled with data on a bar code 18A, the controller 34 performs matching of the data so as to identify the bar code 18A with an image frame number.

According to the present invention, on the basis of the image frame number corresponding to a set of bar code 18A which has just been read and of the number of feed pulses reached by the pulse motor at the time of this reading, the number of feed pulses which corresponds to a predetermined reference position, e.g., the reading position of the bar code indicative of the frame number 0, is calculated. For instance, if a recently read bar code 18A is indicative of the image frame number 2A and, simultaneously, the number of pulses reached at the time of this reading is 1000, the number of feed pulses which corresponds to the bar code indicative of the image frame number 0 is calculated in the following manner. The calculation is based on the fact that there are five steps from the bar code 18A indicative of the image frame number 2A to the bar code 18A indicative of the image frame number 0, and that one step covers a distance of 190 mm (i.e., the dimension corresponding to the pitch of a half size image frame):

$$5 \times 190 + 1000 = 1950$$

According to this embodiment, this calculation is performed using two different bar-code reading positions. If the results of the calculations do not accord with each other, the feed pulse number corresponding to the bar code which has been read first is cancelled. Thereafter, calculation is performed again using another bar-code reading position, and the results of the calculations are again compared. Such calculations are repeated until the results of calculations accord with each other. In this way, the correct number of pulses which corresponds to the predetermined reference position is determined.

By virtue of this arrangement, if the predetermined reference position is used as the starting point, the position of each bar code can be determined as a position corresponding to a certain number of feed pulses for each predetermined pitch. Furthermore, since the image frame numbers are arranged in a predetermined sequence, if the actually read frame number is compared employing the calculated feed pulse number, it is possible to determine whether or not reading has been correctly performed.

The positional information detecting sensors 38 and 39 also detect the connecting portion between a series of negative films 18. That is, the splicing tape pieces 19 connecting the films 18 within one series thereof are each detected to determine the beginning of one negative film 18. On the basis of this determination, a series of frame numbers stored in the RAM 42 is renewed each time one of the splicing tape pieces 19 is detected, and the number of feed pulses corresponding to the predetermined reference position is calculated anew.

The operation of this embodiment will be described with reference to the flow charts shown in FIGS. 7 to 9.

Figure 7:
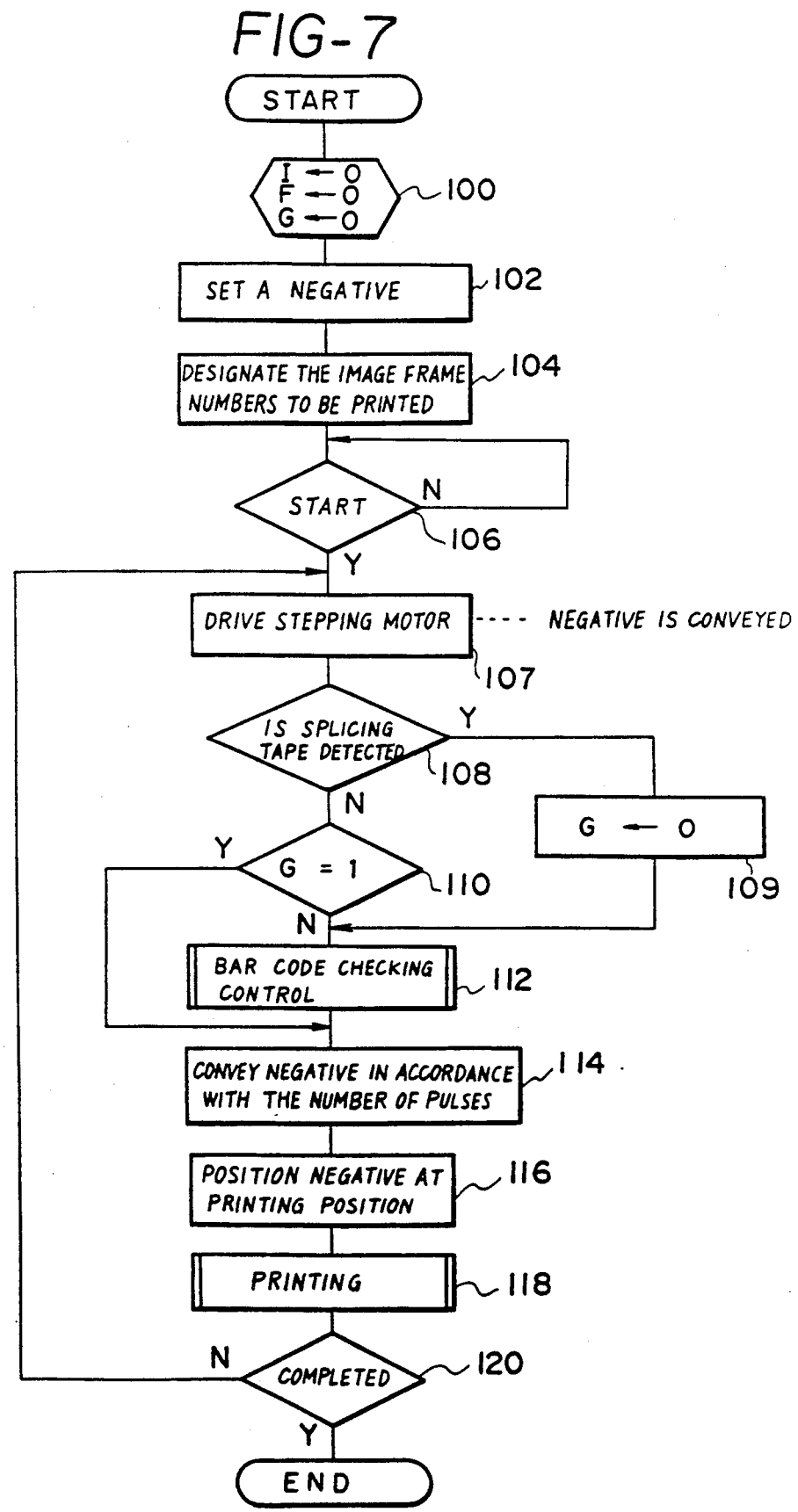
Figure 8:
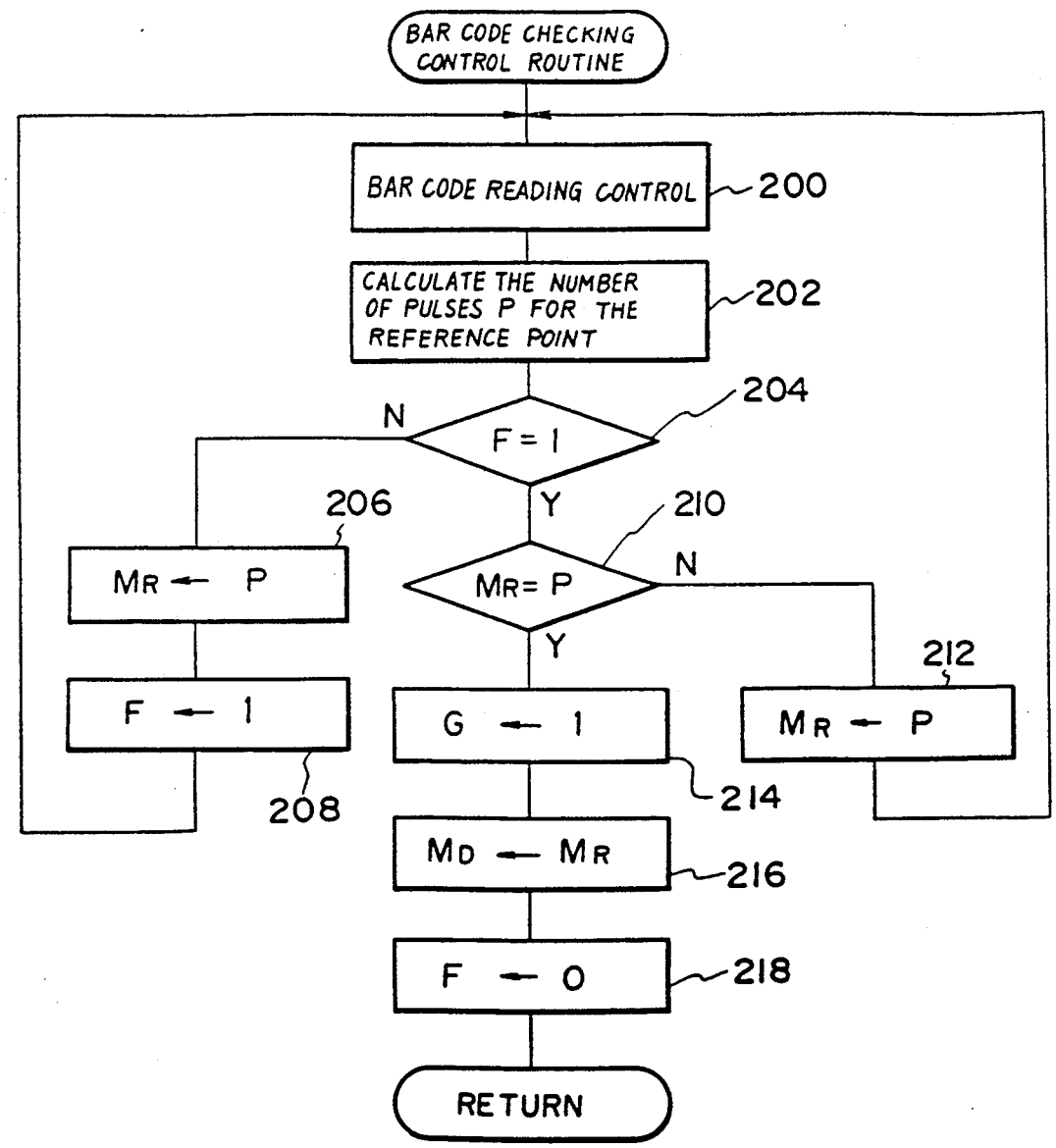

Referring to FIG. 7, at Step 100, a variable I is set to 0, and, simultaneously both flags f and G are reset (at 0). At Step 102, a series of negative films 18 is set. Then, at Step 104, the numbers of image frame whose images are to be printed are designated. Frame numbers may be designated in either a continuous or an intermittent order.

In the following step 106, when the operator actuates a starting switch or the like, processing starts. At Step 107, the drive apparatus 32 is driven (i.e., the stepping motor is started). In the following step 108, it is determined whether any splicing tape piece 19 has been detected. If no splicing tape piece 19 has been detected, it is determined that part within one negative film 18 is to be subjected to processing. In this case, the program proceeds to Step 110 where it is determined whether the flag G has been set. If the flag G has not been set, it is determined that no correspondence has yet been established between the position at which the bar codes 18A are provided and the number of feed pulses of the stepping motor (i.e., that the number of feed pulses corresponding to the reference position has not been set). In this case, the program proceeds to step 112 where bar code checking control is effected. The routine for the bar code checking control will be described later.

On the other hand, if it is determined at step 108 that a splicing tape piece 19 has been detected, the program proceeds to Step 109 where the flag G is reset. Thereafter, the program skips Step 110 and proceeds to Step 112. If it is determined at Step 110 that the flag G has been set, since this means that correspondence has been established between the position of bar codes and the number of feed pulses (i.e., that the number of feed pulses corresponding to the reference position has been set), the program skips Step 112 and proceeds to Step 114.

At Step 114, the series of negative films 18 is fed in accordance with the number of feed pulses corresponding to the position of an image frame of a designated frame number. Then at Step 116, the designated image frame is positioned in the printing position. When the position of the designated image frame is thus determined, the program proceeds to Step 118 where a printing operation is effected. Subsequently, at Step 120, it is determined whether printing with respect to all the designated image frames has been completed. If the printing has not been completed, the program proceeds to Step 107, the designated image frames are subsequently positioned in the printing position, and printing operations are effected. If it is determined that all the designated image frames have been subjected to printing, the execution of the routine is terminated.

Next, referring to the flow chart shown in FIG. 8, the bar code checking subroutine, executed at Step 112, will be described.

Effected first at Step 200 is bar code reading control, which will be described later. When one of the bar codes 18A has been read, the following step 202 is executed. At Step 202, as in the above-described calculation, the number P of feed pulses corresponding to the reference position (which, in this embodiment, is the position of the bar code indicative of the frame number 0) is calculated. In the following step 204, it is determined whether the flag F has been set. The flag F remains in the state of having been reset, after the first bar-code reading operation. Accordingly, the program proceeds to Step 206 where the calculated value P is written into a retention memory $M_R$. Then, at Step 208, the flag F is set to 1. Thereafter, Step 200 is repeated.

If it is determined at Step 204 that the flag F has been set, this means that a previously calculated value P is already written in the retention memory $M_R$. Accordingly, the program proceeds to Step 210 where the value calculated at Step 202 is compared with the value P within the retention memory $M_R$. If $M_R \neq P$, it is determined that either of the values is incorrect. In this case, the program proceeds to Step 212 to write a newly calculated value P into the retention memory $M_R$ (i.e., to renew the value P within the retention memory $M_R$). Thereafter, the program repeats Step 200, and then executes Steps 202, 204, 210, and 210.

If it is determined at Step 210 that $M_R = P$, it can be determined that the correct number of feed pulses corresponding to the reference position has been calculated. The program therefore proceeds to Step 214 to set the flag G which indicates the determination of the number of feed pulses corresponding to the reference position and which will be used at Step 110 in the main routine (shown in FIG. 7) to recognize the fact. Then, at Step 216, the value $M_R$ stored in the retention memory $M_R$ is written into a determination memory $M_D$. Subsequently, at Step 218, the flag F is reset, which is followed by the termination of the execution of this subroutine.

Next, referring to the flow chart shown in FIG. 9, the bar code reading control subroutine, executed at Step 200 shown in FIG. 8, will be described.

First, at Step 150, the variable I is incremented. Subsequently, at Step 154, it is determined whether there have been any changes in the outputs of the detecting sections 58A, 58B, 58C and 58D during the current feeding of the negative films 18. If there have been no change in the detection outputs, Step 154 is repeated. If any changes have occurred, the program proceeds to Step 156 where it is determined whether or not the two groups of outputs of the pair of detecting sections 58A to 58D, which are disposed in correspondence with the vicinity of the two longitudinal ends of the bars of the bar codes 18A, are identical with each other. If the result of the determination is negative, that is, if it is determined that the two groups of detection outputs are not identical with each other, what has been detected is determined to be a numeric character or the like, which is not vertically symmetrical. In this case, because there is no need to perform conversion in accordance with the detection outputs, the program returns to Step 154. This is because, in some cases, the negative films 18 may be provided with numeric characters or symbols which are not the bar codes 18A but which move on that locus of the negative films 18 which is detected by the detecting sections 58A to 58D. In this embodiment, the bars of the codes 18A are each read in the vicinity of the two longitudinal ends thereof, as indicated by the one-dot and two-dot chain lines in FIG. 2. By virtue of this arrangement, it is possible to prevent the risk of any numeric characters or symbols which are not the bar codes 18A being erroneously detected as members of the bar codes 18A, thereby preventing any erroneous detection.

On the other hand, if it is determined at Step 156 that the upper and lower detection outputs are identical, since what has been detected can be determined to be a member of a bar code 18A, the program proceeds to Step 158 where what has been detected is discriminated as an Ith bar. If discrimination is impossible, this fact is determined at Step 160, then the program returns to 154. If the Ith bar has been discriminated at Step 158, this fact is determined at Step 160. Then, the program proceeds to 162 where the data indicated by the discriminated bar is written into the table in the RAM 42 starting with one side of the table (i.e., with the right side as viewed in FIG. 6). At this time, if data indicated by previously discriminated bars are already written in the table, these data are successively shifted in the forward direction.

In the following step 164, it is determined whether the variable I has reached the upper limit, e.g., 13, of the number of bars within one set of bar code 18A. If $I \geq 13$ is determined, it is therefore determined that the reading of all the bars of the one set of bar code 18A has been completed. In this case, the program proceeds to Step 166 where the variable is reset to 0, and subsequently, returns to the main routine.

On the other hand, if $I < 13$ is determined at Step 164, it is therefore determined that the reading of the one set of bar code is not completed yet. In this case, Step 168 is executed, in which it is determined whether the negative films 18 are being fed in the reverse direction. If the films 18 are not being fed in the reverse direction, the program proceeds to Step 108 of the main routine. If the films 18 are being fed in the reverse direction, the program proceeds to Step 170 where a part of bar code data stored in the table is removed starting with that one side (i.e., with the right side as viewed in FIG. 6) in accordance with the distance of the reverse feeding. At this time, the remaining bar code data are successively shifted in the reverse direction. When the execution of Step 170 is completed, the variable I is decremented, then the program returns.

In this way, the bars constituting one set of bar code 18A are discriminated one by one on the basis of changes in the detection output of the detecting sections 58A to 58D. Furthermore, if reverse feeding occurs, a part of the read bar code data is cancelled in accordance with the distance of the reverse feeding. This makes it possible to prevent any reading error and, hence, to ensure correct reading of the bar codes 18A.

In this way, according to the present invention, the position and the number of a designated image frame can be checked on the basis of the number of feed pulses of the pulse motor. If the number of an image frame has been erroneously read, the correct number of this image frame can be estimated. Therefore, even if there has been any reading error, there is no need to interrupt the printing operations, or cancel the printing operation with respect to the image frame corresponding to the erroneously read bar code. Thus, it is possible to perform the printing operations smoothly and in accordance with the designated order.

If a plurality of negative films are connected in a series, since each negative film can be discriminated by detecting the splicing tape pieces by means of which the films are connected, this makes it possible to prevent any erroneous recognition of frame numbers.

Furthermore, according to the foregoing embodiment of the present invention, since positional information detecting sensors are disposed in the vicinity of the longitudinal ends of the bars of the bar codes, it is possible to prevent any numeric characters, symbols or the likes which may move on the same locus as the bar codes, from being erroneously detected as members of the bar codes, thereby enhancing the operational efficiency.

As has been described above, with the photographic film positional information reading method in accordance with the present invention, even when any errors have occurred in the reading of the positional information item corresponding to a designated image frame, it is possible to check the number and the position of the designated image frame.

What is claimed is:

1. A method of reading positional information on photographic film in which items of positional information are read during the feeding by a feed mechanism of an elongated photographic film in the longitudinal direction thereof, said positional information items being provided in a predetermined sequence and in correspondence with at least one image frame recorded on the film in the longitudinal direction, said method comprising the steps of:

sensing feed pulses associated with the feeding of said film by said feed mechanism;

(a) calculating a number of feed pulses reached at the time of reading a positional information item, by performing addition or subtraction of feed pulses in accordance with the direction and the distance which the photographic film is fed, said feed pulses having a predetermined pitch interval therebetween;

(b) calculating a reference number of feed pulses corresponding to a predetermined reference position on the basis of said calculated number and the information read in step (a);

(c) checking a position at which each of the items of positional information is read, by comparing the information read in each of said positional information items with a number of feed pulses calculated as to said position, on the basis of said reference number of feed pulses corresponding to said predetermined reference position calculated in step (b);

based on the position checked of each of the items of positional information, determining whether the information read in each of said positional information items corresponds to said number of feed pulses calculated as to said position; and printing said at least one image frame corresponding to said positional information read in accordance with said determining step.

2. A method of reading positional information on photographic film according to claim 1, wherein said steps (a) and (b) are repeated so as to obtain calculated values for the reference number of feed pulses corresponding to said predetermined reference position, the method further comprising the step of: (d) comparing said calculated values to see if they accord with each other; and (e) determining that the reference number of feed pulses corresponding to said predetermined reference position is correct if said calculated values accord with each other.

3. A method of reading positional information on photographic film according to claim 2, wherein said step (c) is executed using the reference number of feed pulses corresponding to said predetermined reference position that has been determined to be correct in step (e).

4. A method of reading positional information on photographic film according to claim 2, wherein steps (a) and (b) are repeated until a last-reference number of feed pulses corresponding to said predetermined reference position accords with a previously-reference number of feed pulses corresponding to said predetermined reference position.

5. A method of reading positional information on photographic film in which positional information is read by detecting bar codes during the feeding by a feed mechanism of an elongated photographic film in the longitudinal direction thereof, said bar codes being provided in correspondence with the frame interval at which a plurality of image frames are recorded on the film in the longitudinal direction, and also being indicative of items of positional information on the corresponding image frames, said method comprising the steps of:

sensing feed pulses associated with the feeding of said film by said feed mechanism;

(a) calculating a number of feed pulses reached at the time of reading a bar code, by performing addition or subtraction of feed pulses in accordance with the direction and the distance which the photographic film is fed, said feed pulses having a predetermined pitch interval therebetween;

(b) calculating a reference number of feed pulses corresponding to a predetermined reference position on the basis of said calculated number and the information indicated by said bar code read in step (a);

(c) determining whether a positional information item indicated by each of the bar codes subsequently read is correct, by comparing said positional information with the number of feed pulses calculated as to the position of reading each of the bar codes, on the basis of said reference number corresponding to said predetermined reference position calculated in step (b); and printing said image frame corresponding to said positional information read in accordance with said determining step.

6. A method of reading positional information on photographic film according to claim 5, wherein said steps (a) and (b) are repeated so as to obtain calculated values for said reference number of feed pulses corresponding to said predetermined reference position, the method further comprising the steps of: (d) comparing said calculated values to see if they accord with each other; and (e) determining that the reference number of feed pulses corresponding to said predetermined reference position is correct if said calculated values accord with each other.

7. A method of reading positional information on photographic film according to claim 6, wherein said step (c) is executed using the reference number of feed pulses corresponding to said predetermined reference position that has been determined to be correct in step (e).

8. A method of reading positional information on photographic film according to claim 7, wherein steps (a) and (b) are repeated until a last-reference number of feed pulses corresponding to said predetermined reference position accords with a previously-reference number of feed pulses corresponding to said predetermined reference position.

9. A method of reading positional information on photographic film in which items of positional information are read during the feeding of an elongated photographic film by a feed mechanism, said positional information items being provided in a predetermined sequence and in correspondence with each of image frame recorded on the film in the longitudinal direction thereof, said method comprising the steps of:

sensing feed pulses associated with the feeding of said film by said feed mechanism;

calculating a number of feed pulses reached at the time of reading a positional information time, by performing addition and subtraction of feed pulses in accordance with the direction and the distance which the photographic film is fed, said feed pulses having a predetermined pitch interval therebetween;

determining at least once a reference number of feed pulses corresponding to a predetermined reference position on the basis of said calculated number and the read positional information;

determining whether the determined reference number of feed pulses accords with a value for the reference number of feed pulses corresponding to said predetermined reference position which is determined at the time of the next reading of the positional information; and printing said image frame corresponding to said positional information read in accordance with said determining step.

* * * * *